(12) United States Patent
Tsuzuki et al.

(10) Patent No.: US 8,817,576 B2
(45) Date of Patent: Aug. 26, 2014

(54) DISTANCE SENSOR FOR VEHICLE WITH ELECTRICAL CONNECTOR

(75) Inventors: Takeo Tsuzuki, Toyota (JP); Yasuhiro Kawashima, Okazaki (JP); Tadao Shimizu, Tokai (JP)

(73) Assignee: Denso Coporation, Kariya (JP)

( * ) Notice: Subject to any disclaimer, the term of this patent is extended or adjusted under 35 U.S.C. 154(b) by 485 days.

(21) Appl. No.: 13/075,476

(22) Filed: Mar. 30, 2011

(65) Prior Publication Data

US 2011/0242942 A1    Oct. 6, 2011

(30) Foreign Application Priority Data

Mar. 30, 2010  (JP) ................................. 2010-079489

(51) Int. Cl.
*G01S 3/80*    (2006.01)
*G01S 3/801*   (2006.01)
*G01S 11/14*   (2006.01)

(52) U.S. Cl.
CPC . *G01S 3/801* (2013.01); *G01S 11/14* (2013.01)
USPC .......................................... 367/121; 367/118

(58) Field of Classification Search
USPC .................................................. 367/118, 121
See application file for complete search history.

(56) References Cited

U.S. PATENT DOCUMENTS

| | | | | |
|---|---|---|---|---|
| 4,037,912 A | * | 7/1977 | Besser et al. | 439/724 |
| 4,614,143 A | * | 9/1986 | Ingwersen | 83/622 |
| 5,045,977 A | * | 9/1991 | Cesar | 361/816 |
| 5,065,941 A | * | 11/1991 | Suzuki et al. | 439/264 |
| 5,516,299 A | | 5/1996 | Fukuda et al. | |
| 5,694,373 A | * | 12/1997 | Garde | 367/135 |
| 6,004,160 A | * | 12/1999 | Korsunsky et al. | 439/660 |
| 6,227,501 B1 | * | 5/2001 | Malcolm | 248/27.3 |
| 7,376,493 B2 | | 5/2008 | Takeichi et al. | |
| 7,625,234 B1 | * | 12/2009 | Lee et al. | 439/607.07 |
| 8,411,532 B2 | * | 4/2013 | Tsuzuki et al. | 367/188 |

(Continued)

FOREIGN PATENT DOCUMENTS

| | | |
|---|---|---|
| JP | 2-102684 | 4/1990 |
| JP | 6-176822 | 6/1994 |

(Continued)

OTHER PUBLICATIONS

Notification of Reasons for Rejection dated Feb. 2, 2012 in corresponding JP Application No. 2010-079489 with English translation thereof.

*Primary Examiner* — Isam Alsomiri
*Assistant Examiner* — James Hulka
(74) *Attorney, Agent, or Firm* — Harness, Dickey & Pierce, P.L.C.

(57) ABSTRACT

A distance sensor for vehicles is provided which includes a sensor device and an electric connector for an electrical connection between the sensor device and a mating connector. The connector includes at least one first terminal pin and at least one second terminal pin. The first terminal pin has a first section leading to the sensor device and a second section extending toward an inlet opening of the connector. The second terminal pin has a first section leading to the sensor device and at least two branched second sections extending toward the inlet opening of the connector. Specifically, the second terminal pin is shaped to provide two-pin plugs, thereby permitting the size of the connector to be reduced, which facilitates ease of installation of the distance sensor to, for example, a bumper of the automotive vehicle.

11 Claims, 13 Drawing Sheets

(56) References Cited

U.S. PATENT DOCUMENTS

| | | | |
|---|---|---|---|
| 2003/0034883 A1* | 2/2003 | Sato et al. | 340/435 |
| 2006/0009883 A1* | 1/2006 | Takeichi et al. | 701/1 |
| 2006/0226222 A1* | 10/2006 | Yu et al. | 235/441 |
| 2006/0279377 A1* | 12/2006 | Loeffelholz et al. | 333/100 |
| 2007/0220981 A1* | 9/2007 | Nakajima et al. | 73/661 |
| 2007/0230273 A1* | 10/2007 | Nakajima et al. | 367/140 |
| 2007/0230274 A1* | 10/2007 | Nakajima et al. | 367/140 |
| 2011/0242941 A1* | 10/2011 | Tsuzuki et al. | 367/118 |

FOREIGN PATENT DOCUMENTS

| | | |
|---|---|---|
| JP | 06-223903 | 8/1994 |
| JP | 8-293364 | 11/1996 |
| JP | 2004-14495 | 1/2004 |
| JP | 2004-253912 | 9/2004 |
| JP | 2006-023108 | 1/2006 |

* cited by examiner

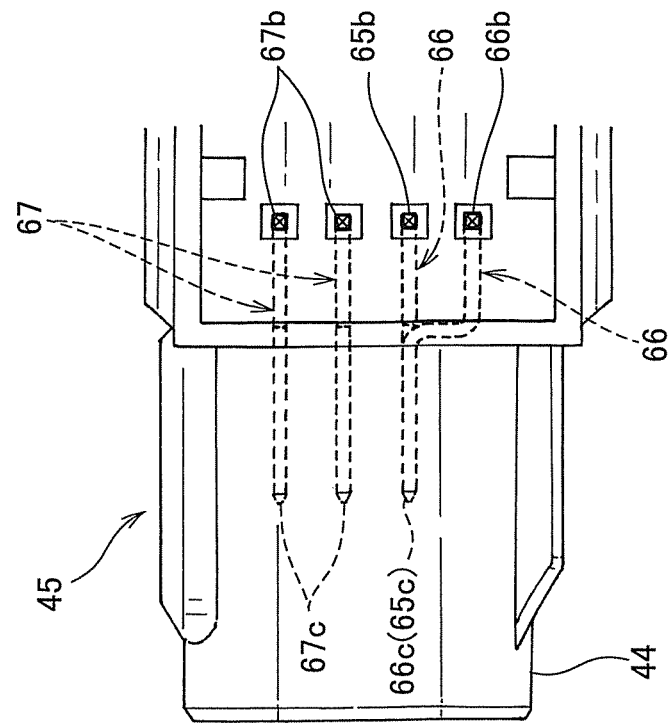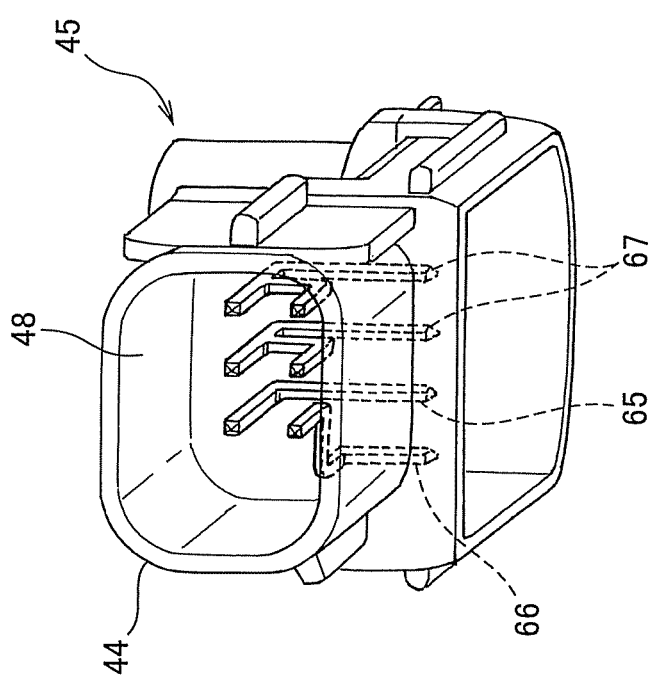

DISTANCE SENSOR FOR VEHICLE WITH ELECTRICAL CONNECTOR

CROSS REFERENCE TO RELATED DOCUMENT

The present application claims the benefits of Japanese Patent Application No. 2010-79489 filed on Mar. 30, 2010, the disclosure of which is incorporated herein by reference.

BACKGROUND OF THE INVENTION

1. Technical Field

The present invention relates generally to a distance sensor with a compact and easy-to-install structure of an electrical connector which may be used with an obstacle detection system for vehicles.

2. Background Art

Ultrasonic sensors are known which are used as automotive distance sensors (also called range sensors) which measure the distance between the vehicle and an obstacle using an ultrasonic wave. Some of modern vehicles such as automobiles are equipped with an obstacle detector called a clearance sonar system for assisting the driver in parking the vehicle. The clearance sonar system has a plurality of ultrasonic sensors (e.g., two installed in a front bumper, and four installed in a rear bumper) and works to measure the amount of time required by the ultrasonic wave, as transmitted from each of the ultrasonic sensors, to travel to and return from an obstacle and determine the distance between the vehicle and the obstacle based on the measured amount of time. When such a distance decreases below a given value, the clearance sonar system alerts the driver by sound.

FIGS. 12(a) and 12(b) illustrate an example of electrical connections between ultrasonic sensors used in the above type of a clearance sonar system. The ultrasonic sensors are connected in series to an electronic control unit (ECU) through harnesses each of which is equipped with ground, serial-communication, and power supply cables. Each of the ultrasonic sensors has an input and an output terminal (denoted by "IN" and "OUT" in the drawing) to which the power supply cables are joined for the daisy-chain connection of the ultrasonic sensors. A connector of each of the ultrasonic sensors, therefore, has at least four conductive terminals. In case of four conductive terminals, the two ground cables need to be tied and joined, as indicated by numeral 91, to one of the terminals of the connector. The same applies to the serial-communication cables. This results in an increase in production cost of the harnesses. In order to avoid this drawback, the connector of the ultrasonic sensor may be, as illustrated in FIG. 12(b), designed to have six conductive terminals. In this case, a circuit board of the ultrasonic sensor has to have two electric joints 92.

The above six-terminal structure of the connector is useful for cost reduction of the harnesses, but will lead to an increase in overall size of a casing 45' of an ultrasonic sensor 3', as illustrated in FIG. 13. This also results in increased constraints on installation of the ultrasonic sensor 3' in a bumper 2 of the vehicle. Particularly, it becomes difficult to insert the casing 45' into a mount hole 47 of the bumper 2, thus requiring the need for disassembling the ultrasonic sensor 3' into two parts: a bezel 49' and the casing 45'. This results in an increase in time consumed to fix the ultrasonic sensor 3' to the bumper 2.

Japanese Patent First Publication No. 6-176822 (corresponding to U.S. Pat. No. 5,516,299 filed on Dec. 7, 1993) discloses the above type of a multi-input connector.

SUMMARY

It is therefore an object to provide a compact and/or easy-to-install structure of a distance sensor for vehicles.

According to one aspect of an embodiment, there is provided a distance sensor which is to be mounted in a vehicle. The distance sensor comprises: (a) a sensor device which works to transmit a signal and receive a return of the signal from an object to determine a distance to the object; (b) a casing in which the sensor device is retained; and (c) an electrical connector joined to the casing, the connector having an opening formed therein and also having a plurality of terminal strips disposed therein. At least one of the terminal strips is a first terminal strip which includes a first section leading to the sensor device and a second section extending toward the opening for achieving an electric connection with a mating member. At least another one of the terminal strips is a second terminal strip which includes a first section leading to the sensor device and at least two branched second sections extending toward the opening for achieving electric connections with the mating member.

Specifically, the second section of the first terminal strip servers as a single plug for achieving the electrical connection with the mating member such as a connector of a harness, while the second section of the second terminal strip provides at least two plugs. This permits the overall size of the ultrasonic sensor to be reduced, which facilitates ease of installation to, for example, a bumper of an automotive vehicle.

In the preferred mode of the embodiment, the connector may include at least two first terminal strips each of which has the first section leading to the sensor device and the second section extending toward the opening for achieving the electric connection with the mating member. The second sections of the first terminal strips serve as an input terminal to which electric power is inputted from the mating member and an output terminal from which the electric power is outputted to the mating member, respectively. This enables the distance sensor to be daisy-chain connected to the same type of distance sensors.

The first and second sections of the second terminal strip may be laid to be flush with on the same plane. This permits the second terminal strip to be made easily by punching a metal plate.

One of the branched second sections of the second terminal strip may diverge from another of the branched second sections through a band. The length of the first section of the first terminal strip is substantially identical with the length of the first section of the second terminal strip. The first sections of the first and second terminal strips are arrayed on a first plane, and the second section of the first terminal strip and another of the branched second sections of the second terminal strip are arrayed on a second plane. The plane extends perpendicular to the second plane.

The connector may alternatively include a plurality of first terminal strips each of which includes the first section leading to the sensor device and the second section extending toward the opening for achieving the electric connection with the mating member and a plurality of second terminal strips each of which includes the first section leading to the sensor device and the branched second sections extending toward the opening for achieving the electric connections with the mating member. The second sections of the first and second terminal strips are arrayed in a grid pattern, as viewed from outside the opening of the connector, so that ends of the second sections lie on intersections of horizontal and vertical lines of the grid pattern. This permits the width of the electrical connector to be decreased as compared with an in-line multi-pin connector.

The first and second terminal strips may be each formed by punching a metal plate.

The sections of the first and second terminal strips may be insert-molded with the connector.

The sensor device transmits a signal in the form of a ultrasonic wave.

The connector may alternatively include two first terminal strips each of which has the first section leading to the sensor device and the second section extending toward the opening for achieving the electric connection with the mating member and two second terminal pins each of which has the first section leading to the sensor device and the branched second sections extending toward the opening for achieving the electric connections with the mating member. One of the first terminal strips has the second section bent into a crank shape to have a straight section extending over the second section of the other first terminal strip in parallel thereto. The straight section of the first terminal strip and one of the branched second sections of each of the second terminal strips are laid on a first plane. The second section of the other first terminal strip and the other of the branched second sections of each of the second terminal strips are laid on a second plane extending substantially parallel to the first plane.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 7(a) is a perspective view which shows an electrical connector of the ultrasonic sensor of FIG. 4;

FIG. 7(b) is a plan view of FIG. 7(a);

DESCRIPTION OF THE PREFERRED EMBODIMENTS

Figure 1:
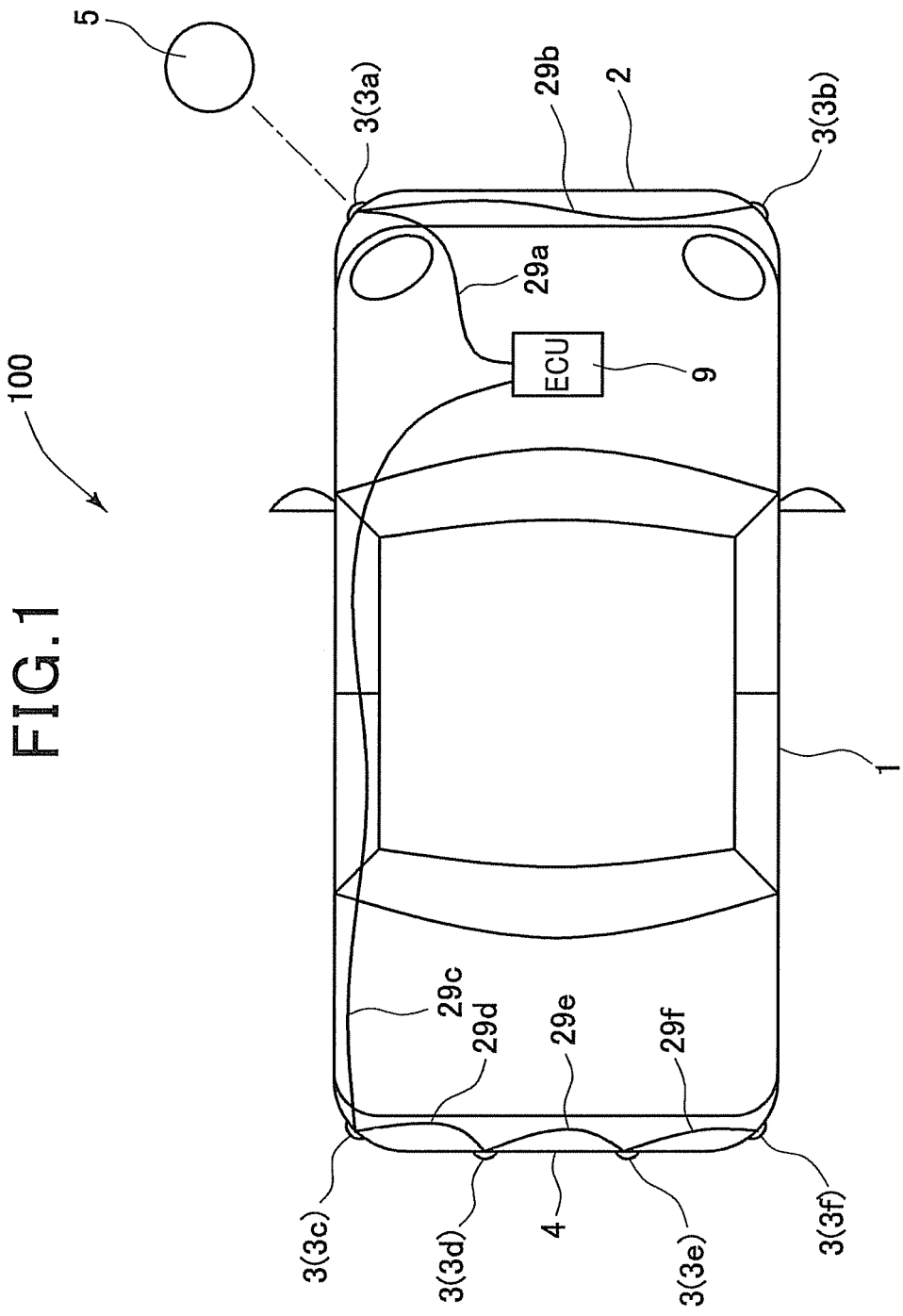
FIG. 1 is a plan view of an automobile equipped with ultrasonic sensors according to an embodiment.

Referring to the drawings, wherein like reference numbers refer to like parts in several views, particularly to FIG. 1, there is shown an automotive obstacle detector 100 according to the first embodiment which is implemented by a clearance sonar system. The obstacle detector 100 are equipped with two front ultrasonic sensors 3a and 3b attached to left and right corners of a front bumper 2 of a motor vehicle 1 and three rear ultrasonic sensors 3c, 3d, 3e, and 3f attached to left and right corners and a middle portion of a rear bumper 4. These ultrasonic sensors will also be generally referred to by numeral 3 below. When a given condition is encountered, the ultrasonic sensor 3 is activated to transmit a radar wave in the form of an ultrasonic wave outward of the vehicle 1 and receive a return thereof (i.e., a radar echo) from an obstacle 5 to determine the distance between the vehicle 1 and the obstacle 5. When the distance to the obstacle 5 becomes smaller than a given value, the obstacle detector 100 alerts the driver of the vehicle 1 by sound.

Figure 2:
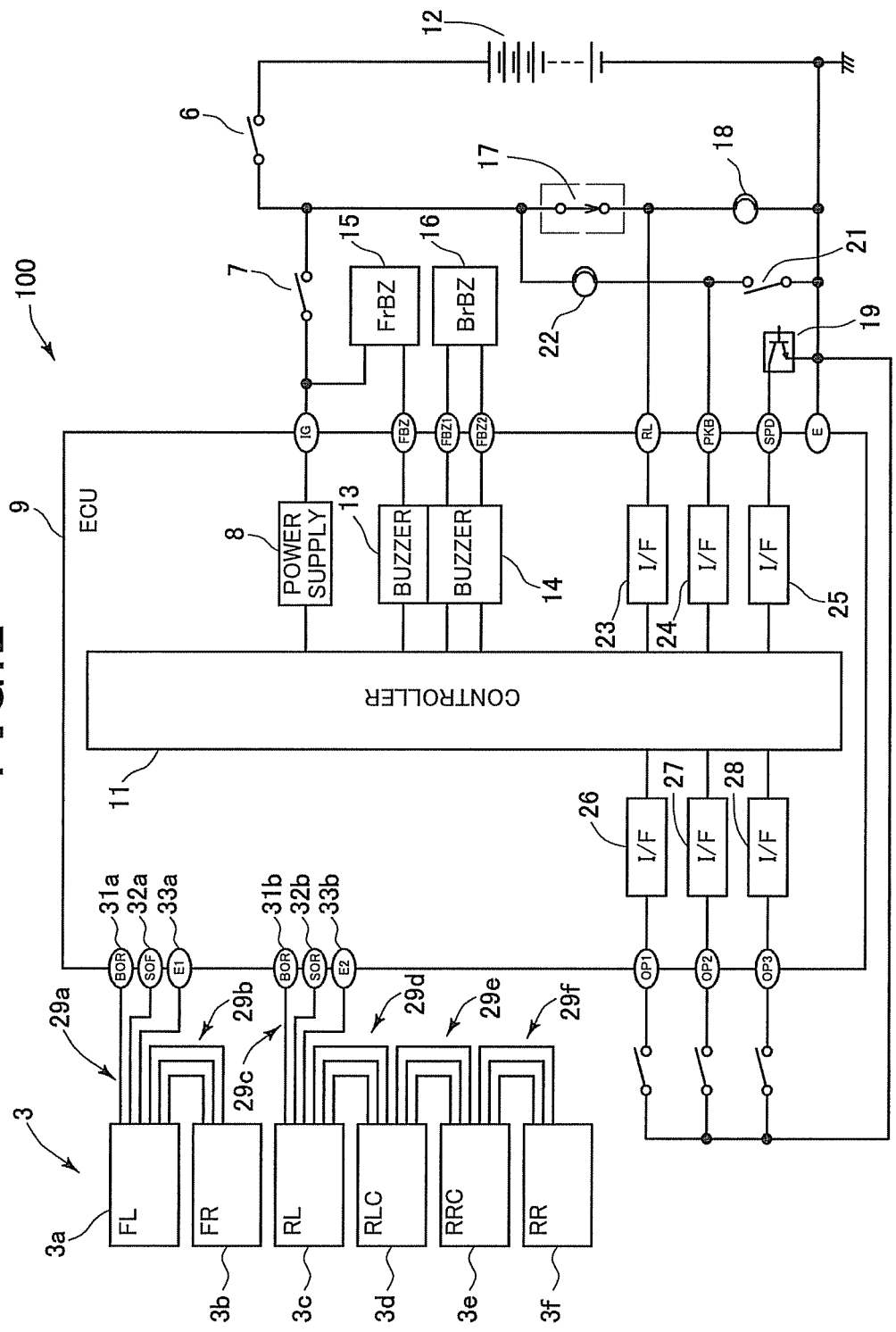
FIG. 2 is a circuit diagram which illustrates an obstacle detector equipped with the ultrasonic sensors of FIG. 1.

FIG. 2 is a circuit diagraph of the obstacle detector 100. In operation, when a main switch 7 of the obstacle detector 100 is placed in an on-state, and an ignition switch 6 is turned on by the driver, electric power is supplied from a battery 12 to a control circuit 11 through a power supply circuit 8. Buzzers 15 and 16 are also placed in a standby state. The buzzer 15 is connected to the front ultrasonic sensors 3a and 3b through a buzzer circuit 13. Similarly, the buzzer 16 is connected to the rear ultrasonic sensors 3c, 3d, 3e, and 3f through a buzzer circuit 14. When the driver places a shift lever of an automatic transmission of the vehicle 1 in a position other than a parking (P) position, a start switch 17 is turned on, so that the obstacle detector 10 starts to operate. When the driver places the shift lever in a reverse (R) position, a backup lamp 18 is turned on to bring only the rear ultrasonic sensors 3c, 3d, 3d, and 3f into the operable state. The obstacle detector 100 also includes a vehicle speed sensor 19 which measures the speed of the vehicle 1 and is placed in the operable state only when the measured speed of the vehicle is less than, for example, 10 km/h. The obstacle detector 100 is placed in the inoperable state when the parking brake of the vehicle 1 is actuated. A parking brake switch 21 is used to monitor the operating state of the obstacle detector 100. When the parking brake is actuated, a parking brake lamp 22 is turned on to inform the driver of such a fact. The backup lamp 18, the vehicle speed sensor 19, the parking brake switch 21, and the parking brake lamp 22 are electrically connected to the control circuit 11 through interfaces 23, 24, and 25. Optional peripheral devices associated with the obstacle detector 100 are to be connected to the control circuit 11 through interfaces 26, 27, and 28.

The ultrasonic sensors 3a to 3f are, as can be seen in FIGS. 1 and 2, connected electrically to the ECU 9. Specifically, the front ultrasonic sensor 3a mounted in the left corner (i.e., a front passenger side) of the front bumper 2 is connected to a ground (GND) terminal 31a, a front serial-communication terminal 32a, and a power supply terminal 33a through a harness 29a. The front ultrasonic sensor 3b mounted in the right corner (i.e., a driver's side) of the front bumper 2 is connected in series with the front ultrasonic sensor 3a through a harness 29b. Similarly, the rear ultrasonic sensor 3c mounted in the left corner of the rear bumper 4 is connected to a ground (GND) terminal 31b, a rear serial-communication terminal 32b, and a power supply terminal 33b through a harness 29c. The rear ultrasonic sensors 3d, 3e, and 3f mounted in the middle portion and the right corner of the rear bumper 4 are sequentially connected in series with the rear ultrasonic sensor 3c through harnesses 29d, 29e, and 29f, respectively.

The electric connections between the front ultrasonic sensors 3a and 3b mounted in the front bumper 2 will be described below with reference to FIG. 3.

The front ultrasonic sensors 3a and 3b have power supply input (IN) terminals 34a and 34b and power supply output (OUT) terminals 35a and 35b, respectively. The power supply input terminal 34a of the ultrasonic sensor 3a is coupled to the power supply terminal 33a of the ECU 9. The power supply output terminal 35a of the ultrasonic sensor 3a is coupled to the power supply input terminal 34b of the ultrasonic sensor 3b in the form of the daisy chain connection. Each of the ultrasonic sensors 3a and 3b is equipped with a power supply circuit made up of a regulator 37 and an FET (Field-Effect Transistor) 38, and an ASIC (Application Specific Integrated Circuit) 36. The regulator 37 of the ultrasonic sensor 3a is disposed between a power supply terminal Vdd of the ASIC 36 and the power supply input terminal 34a. The FET 38 of the ultrasonic sensor 3a is disposed among a SW control terminal of the ASIC 36, the power supply input terminal 34a, and the power supply output terminal 35a. Similarly, the regulator 37 of the ultrasonic sensor 3b is disposed between a power supply terminal Vdd of the ASIC 36 and the power supply input terminal 34b. The FET 38 of the ultrasonic sensor 3b is disposed among a SW control terminal of the ASIC 36, the power supply input terminal 34b, and the power supply output terminal 35b. The FETs 38 work to establish or block the supply of electric power to the ultrasonic sensors 3a and 3b.

Figure 3:
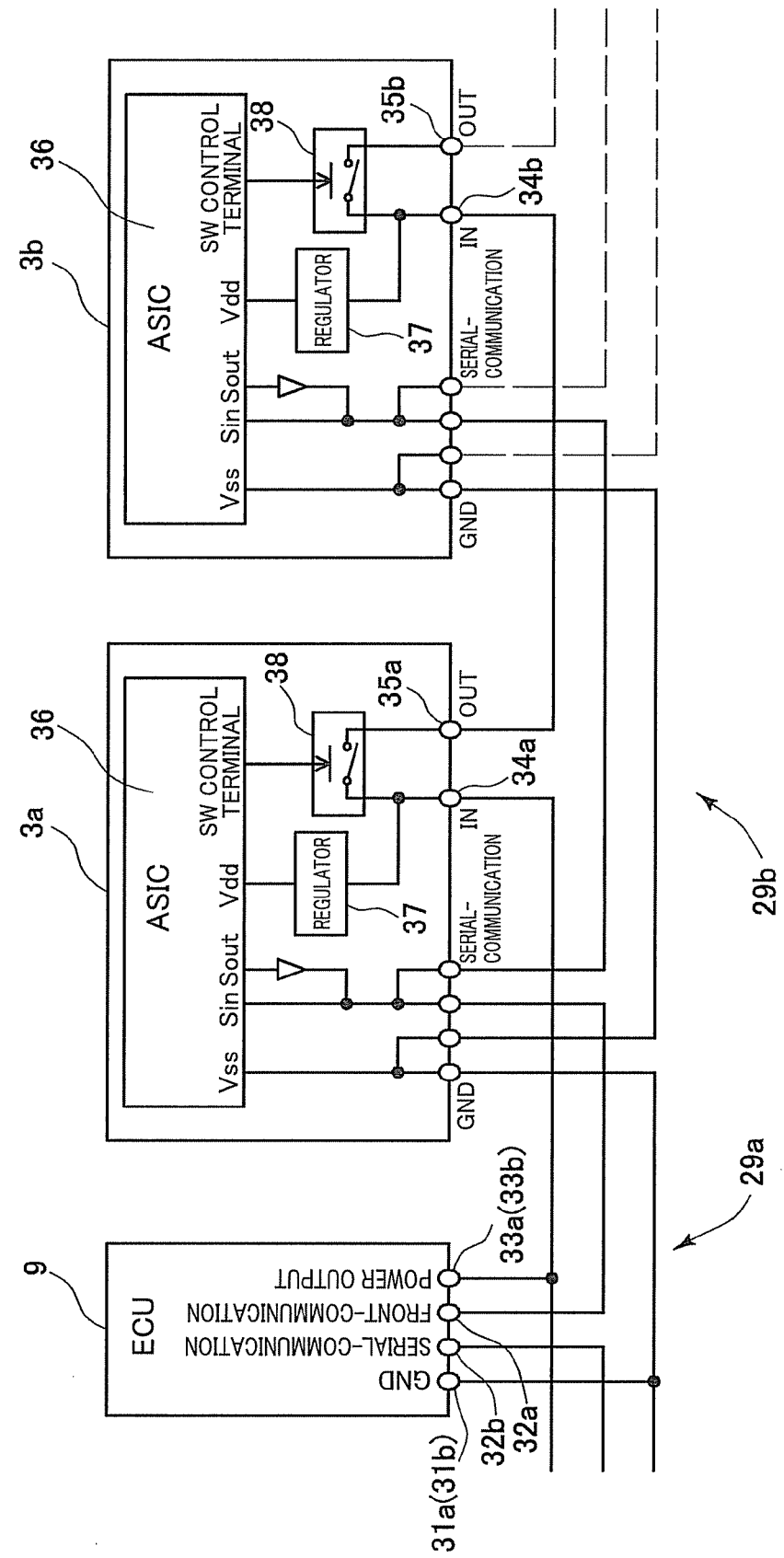
FIG. 3 is a block diagram which illustrates an internal structure of the ultrasonic sensors of FIG. 1 and electrical connections therebetween.

When it is required to mount an additional ultrasonic sensor in, for example, the front bumper 2, it is electrically connected, as indicated by broken lines in FIG. 3, to the ultrasonic sensor 3b. The rear ultrasonic sensors 3c to 3f are connected to one another in the same manner as the front ultrasonic sensors 3a and 3b, and explanation thereof in detail will be omitted here. The ultrasonic sensors 3a, 3b, 3c, 3d, 3e, and 3f are identical in structure with each other, and the following discussion will, therefore, be referred to only one of them, as generally indicated by numeral 3.

The structure of the ultrasonic sensor 3 will be described below with reference to FIGS. 4 and 5.

Figure 10A:
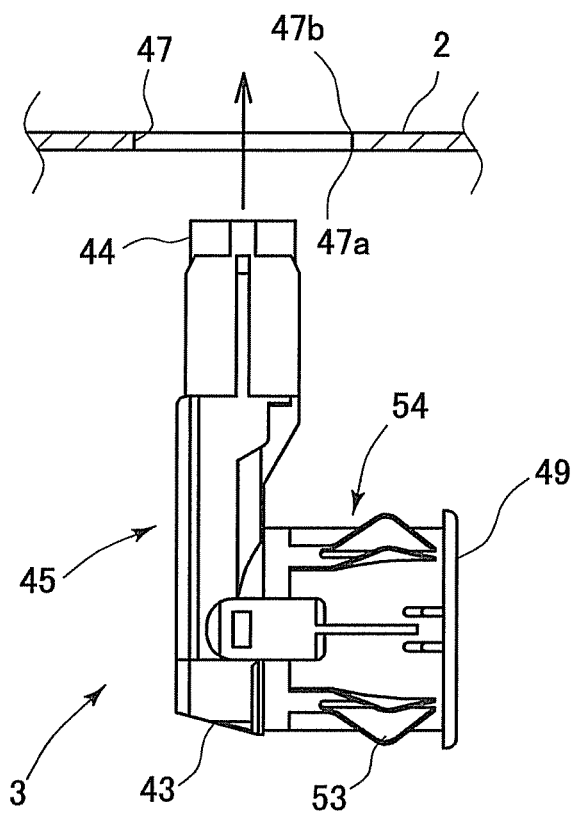
FIGS. 10(a) and 10(b) are views which demonstrate steps of installing the ultrasonic sensor of FIG. 4 to a bumper of an automotive vehicle.
Figure 10B:
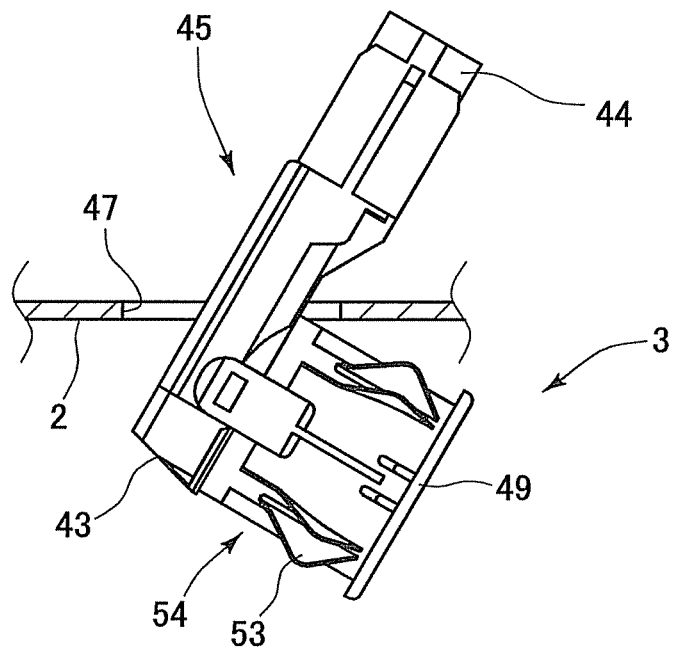

The ultrasonic sensor 3 includes a sensor device 41, a rubber-made cushion 42, a sensor holder 43, an electrical connector 44, a casing 45, and a bezel 49. The sensor holder 43, the connector 44, the casing 45, and the bezel 49 are made of resin. The sensor device 41 is of a cylindrical shape and equipped with a microphone which outputs an ultrasonic wave outward of the vehicle 1 and receives a return thereof from an object. The cushion 42 is disposed around the sensor device 41. The sensor holder 43 retains thereon the cushion 42 in which the sensor device 41 is mounted. The electric connector 44 is, as will be described later in detail, designed as a six-pin plug in this embodiment for an electrical connection with a connector (not shown) of one of the harnesses 29a to 29f. The casing 45 is formed integrally with the sensor holder 43 and the connector 44. The connector 44 may alternatively be joined indirectly to the body of the casing 45. The bezel 49 includes a hollow cylinder 46 fit on the sensor holder 43 of the casing 45 and a flange 48 which extends radially from an end of the cylinder 46. The flange 48 is, as illustrated in FIGS. 10(a) and 10(b), greater in diameter than mount holes 47 formed in the front and rear bumpers 2 and 4. The ultrasonic sensor 3 also includes a retainer 54 and a ring 55. The retainer 54 has an annular base 51, arms 52, and claws 53. The base 51 is engaged with snap-fit retainer claws 59, as will be described later in detail, of the bezel 49. The arms 52 extend from an end of the base 51 in an axial direction of the base 51. The claws 53 are triangular protrusions bulging radially outward of ends of the arms 52, respectively. The ring 55 is disposed in a clearance between an outer periphery of a top portion of the sensor device 41 protruding from an upper end of the cushion 42 and an inner periphery of the cylinder 46 of the bezel 49 when the sensor device 41 is disposed within the cylinder 46 of the bezel 49.

The cushion 42 has formed on a peripheral surface thereof two half column-shaped protrusions 42a which are opposed diametrically to each other. The sensor device 41 has two protrusions 41a which are fit in recesses formed in back surfaces of the protrusions 42a of the cushion 42 to hold the sensor device 41 from turning within the cushion 42.

The bezel 49 is, as described above, equipped with the cylinder 46 and the ring-shaped flange 48 extending from the end of the cylinder 46 outwardly. The cylinder 46 has the inner diameter which is slightly greater than the outer diameter of the cushion 42 and is fit on the periphery of the sensor holder 43 of the casing 45. The cylinder 46 has snap-fit tabs 56, half pipe-like protrusions 58, and the retainer claws 59 formed on the outer periphery thereof. The snap-fit tabs 56 extend in an axial direction of the cylinder 46 and engage claws 57 of the casing 45 to establish a firm joint between the bezel 49 and the casing 45. The protrusions 58 project from the outer periphery of the cylinder 46 and are fit on bulges 43a of the sensor holder 43 together with the protrusions 42a of the cushion 42. The retainer claws 59 protrude from the cylinder 46 and are snap-fit on the base 51 of the retainer 54. The bulges 43a of the sensor holder 43 extend vertically of the sensor holder 43 and are of an Ti-shape in cross section. In other words, each of the bulges 43a has an U-shaped groove formed in an inner wall of the sensor holder 43. Each of the bulges 43a may alternatively be designed to have an inner surface lying flush with the inner surface of the sensor holder 43. Each of the protrusions 41a of the sensor device 41 is fit in the inside recess of a corresponding one of the protrusions 42a of the cushion 42. Each of the protrusions 42a of the cushion 42 is placed on an upper end of a corresponding one of the bulges 43a of the sensor holder 43. Each of the protrusions 58 of the bezel 49 is fit over, in other words, covers a corresponding one of the bulges 43a in contact therewith, thereby positioning or holding the cushion 42 along with the sensor device 41 from turning in the circumferential direction of the sensor holder 43. The upper end of each of the protrusions 42a placed on the bulge 43a in vertical alignment therewith is in abutment with an inner upper end of the protrusion 58, in other words, each of the protrusions 42a is nipped between the inner upper end of the protrusion 58 and the bulge 43a tightly, thereby positioning the cushion 42 along with the sensor device 41 relative to the sensor holder 43.

Figure 4:
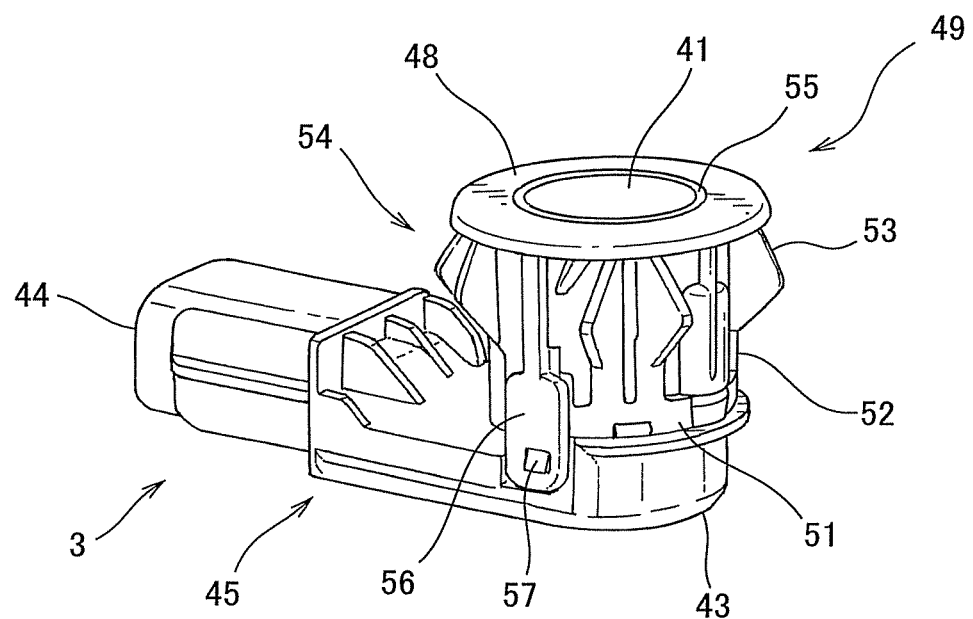
FIG. 4 is a perspective view of the ultrasonic sensor of FIG. 1.
Figure 5:
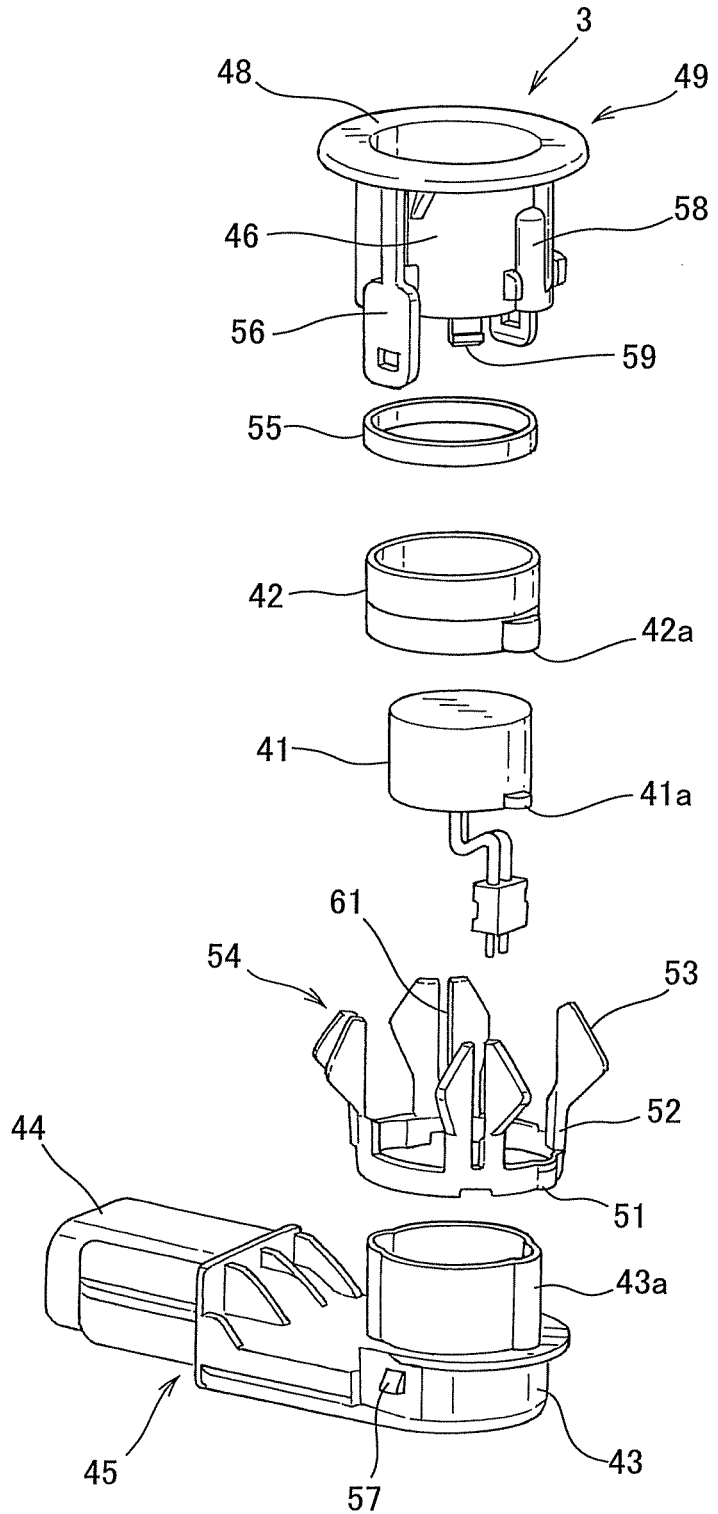
FIG. 5 is an exploded view of the ultrasonic sensor of FIG. 4.
Figure 6A:
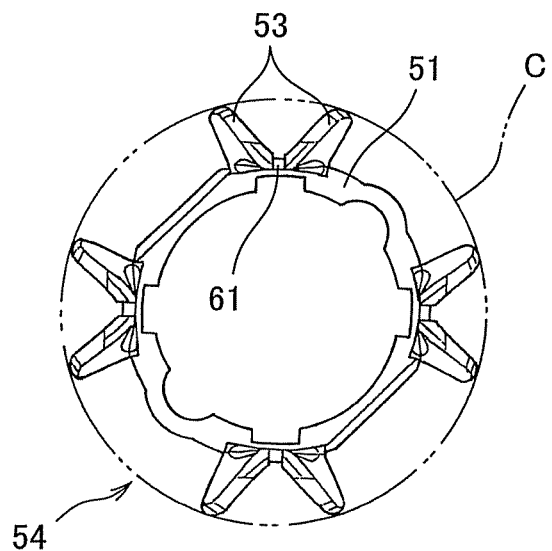
FIG. 6(a) is a plan view which illustrates a retainer of the ultrasonic sensor of FIG. 4.
Figure 6B:
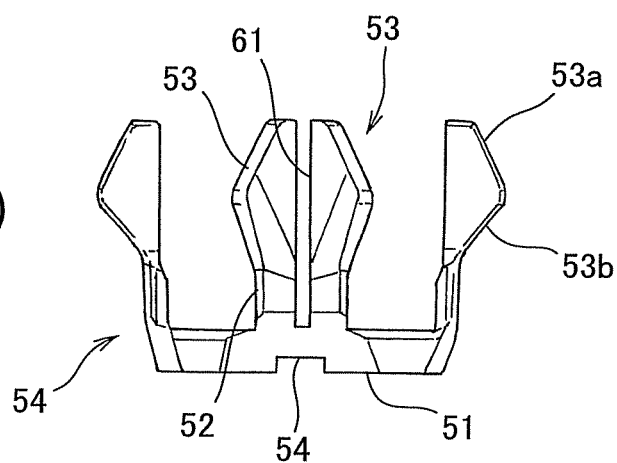
FIG. 6(b) is a front view of FIG. 6(a)
Figure 6C:
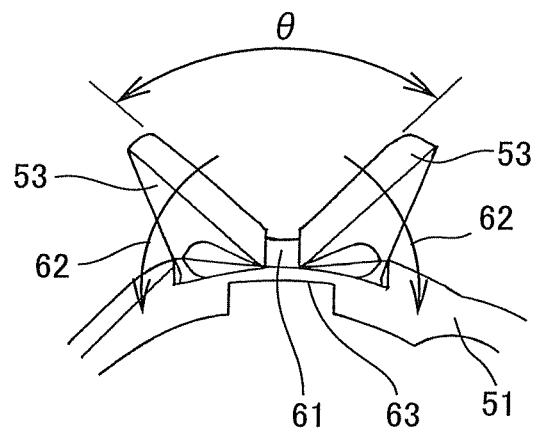
FIG. 6(c) is a partially enlarged view which illustrates claws of the retainer in FIG. 6(a)

The retainer 54 has, as described above, the tuning-fork like four arms 52 extending from the end of the base 52 upward, as viewed in FIGS. 4, 5, and 6(b), in the axial direction of the retainer 54. Each of the arms 52 has the two claws 53 formed on the top end thereof. Each of the claws 53 serves as a thin-walled hook. The two claws 53 of each of the arms 52 extend outward, as clearly illustrated in FIG. 6(a), in the form of a V-shape, as viewed from the axial direction of the retainer 54. The outer diameter of an imaginary circle C, as passing through outermost tops of the claws 53, is set greater than the inner diameter of the mount hole 47. The angle •, as illustrated in FIG. 6(c), which inside faces of the two claws 53 of each of the arms 52 make with each other is preferably within a range of 70° to 90°. Each of the claws 53 is substantially triangular in shape, as viewed from a direction perpendicular to the axis of the retainer 54, and has, as clearly illustrated in FIG. 6(b), upper and lower ridges with slant surfaces 53a and 53b. The slant surface 53a faces upward, as viewed in the drawing, while the slant surface 53b faces downward. Each of the arms 52 has a central vertical slit 61 which extends through the middle of the width thereof, as viewed in a circumferential direction of the retainer 54. In other words, the slit 61 extends in a lengthwise direction of the arm 52 between the claws 53 to the annular base 51 of the retainer 54, thereby forming the claws 53 to be separate completely from each other at bases thereof (i.e., lower ends of the claws 53). The annular base 51 has, as clearly illustrated in FIG. 6(c), formed in an inner circumference thereof recesses defining thin-walled portions 63 near the lower ends of the slits 61. When the retainer 54 is inserted into one of the mount holes 47 of the front and rear bumpers 2 and 4, the claws 53 of each of the arms 52 are elastically deformed or bent at the bases thereof in directions, as indicated by 62 in FIG. 6(c), toward the axis (i.e., the center) of the retainer 54. The slit 61 and the thin-walled portion 61 facilitate the ease of the elastic deformation of the claws 53.

The annular base 51 of the retainer 54 has formed in the bottom thereof recesses 64 to achieve snap-fits with the retainer claws 59 of the bezel 49. Specifically, each of the claws 59 engages a corresponding one of the recesses 64 to establish a firm joint between the bezel 49 and the retainer 54. This minimizes the transmission of stress to the casing 45 when the ultrasonic sensor 3 is installed in the mount hole 47, thereby decreasing the possibility of damage to the casing 45.

The casing 45 has, as described above, the hollow cylindrical sensor holder 43 which retains therein the sensor device 41 fit in the cushion 42. The sensor holder 43 has formed thereon the bulges 43a on which the protrusions 42a of the cushion 42 are placed. The protrusions 58 of the bezel 49 are fit on the bulges 43a of the sensor holder 43, thereby holding the cushion 42 from rotating relative to the sensor holder 43. The sensor holder 43 has formed on a lower portion thereof the claws 57 which create snap-fits with the snap-fit tubs 56 of the bezel 49.

The casing 45 has the connector 44 which has a given length extending horizontally. The connector 44 extends from a side surface of the sensor holder 43 perpendicular to the axis of the sensor holder 43.

The structure of the electrical connector 44 will be described below in detail with reference to FIGS. 7(a) to 8(c).

Figure 8A:
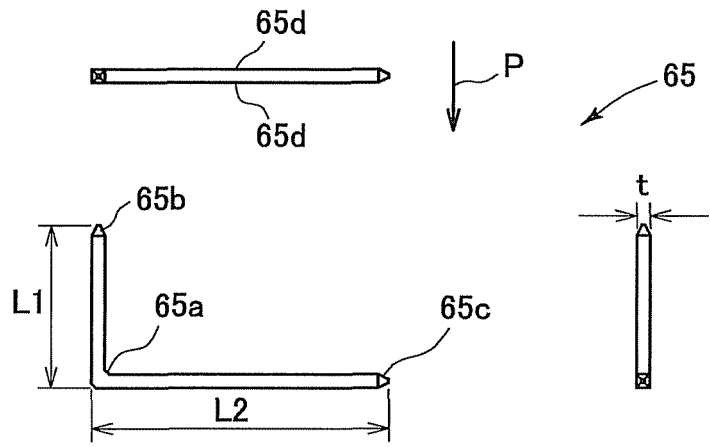
FIG. 8(a) is a three-angled view which shows a terminal pin of the electrical connector of FIGS. 7(a) and 7(b)

The connector 44 is engineered as a multi-pin plug equipped with a plurality of terminal pins 65 to 67 (a total of four pins in this embodiment). The terminal pins 65 to 67 are made of conductive strips for electrical connections with holes of the connector of one of the harnesses 29a to 29f. In this embodiment, the connector 44 is designed as a six-pin plug using the four terminal pins 65 to 67. The terminal pins 65 to 67 are insert-molded with the resinous casing 45. The terminal pins 65 to 67 are bent, as clearly illustrated in FIGS. 8(a) to 8(c), at middle portions 65a, 66a, and 67a thereof to have a substantially L-shaped length. The two terminal pins 65 and 66 are, as can be seen from FIGS. 8(a) and 8(b), different in shape from each other and will also be referred to as first terminal pins below. The first terminal pin 65 has an upright section 65b and a horizontal section 65c. The first terminal pin 66 has an upright section 66b and a horizontal section 66c. The upright sections 65b and 66b of the first terminal pints 65 and 66, as can be seen in FIG. 8(a), extend through a shell of the connector 44 downward, as viewed in FIGS. 5 and 8(a), and connect with a sensor control circuit board (not shown) on which the regulator 37, the EFT 38, the ASIC 36, etc., as already described in FIG. 3, are fabricated. The sensor control circuit board is disposed on or in the bottom of the connector 44 (i.e., the casing 45). The sensor device 41 is also joined electrically to the sensor control circuit board within the casing 45. The horizontal sections 65c and 66c of the first terminal pins 65 and 66 extend parallel to the length of the connector 44 within the shell of the connector 44 toward an opening 48 of the connector 44 for electrical connections with one of the harnesses 29a to 29f. The sections 65c and 66c are used as the input and output terminals 34a and 35a (or 34b and 35b), as illustrated in FIG. 3, to and from electric power is inputted and outputted.

The two terminal pins 67 are identical in shape with each other and will also be referred to as second terminal pins below. The second terminal pins 67 are, as illustrated in FIG. 3, used as the ground (GND) and serial-communication terminals of the ultrasonic sensor 3. Each of the second terminal pins 67, as illustrated in FIG. 8(c), has an upright section 67b and two horizontal sections 67c which are so formed as to have a lower-case "h" shape. The section 67b of each of the second terminal pins 67, like the upright sections 65b and 66b of the first terminal pins 65 and 66, extends through the shell of the connector 45 and connects electrically with the sensor control circuit board, while the horizontal sections 67c extend parallel to the length of the connector 44 toward the opening 48 of the connector 44 for electrical connections with one of the harnesses 29a to 29f. The sections 65b, 66b and 67b (which will also be referred to as first sections below) extend substantially parallel to each other on the same plane. The sections 65c, 66c, and 67c (which will also be referred to as second sections below) extend perpendicular to the sections 65b, 66b, and 67b in this embodiment, but may extend so as to traverse the lengths of the sections 65b, 66b, and 67b, respectively, at an angle other than 90°.

The first terminal pin 65 is, as illustrated in FIG. 8(a), bent at right angles into an L-shape which is made up of the upright and horizontal sections 65b and 65c with tapered tips. The first terminal pin 65 is made by punching a metal plate which is already folded into an L-shape in cross section and has a thickness t using a press. The direction in which the first terminal pin 65 is punched out from the L-shaped metal plate is indicated by "P" in FIG. 8(a). The first terminal pin 65, therefore, has punched side surfaces 65d which extend perpendicular to the direction P and have a fine roughness. The side surfaces 65d serve as electric contacts with the connector of one of the harnesses 29a to 29f. The length of the upright section 65b of the first terminal pin 65 is expressed by L1, and that of the horizontal section 65c is expressed by L2. The same applies, as indicated in FIGS. 8(b) and 8(c), to the pin terminals 66 and 67.

Figure 8B:
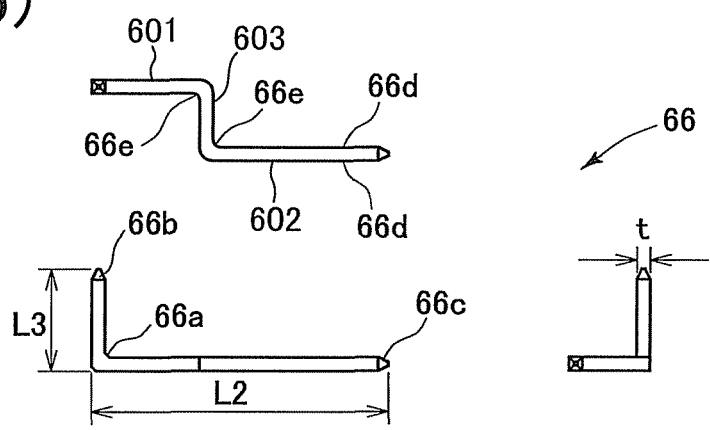
FIG. 8(b) is a three-angled view which shows a terminal pin of the electrical connector of FIGS. 7(a) and 7(b)
Figure 8C:
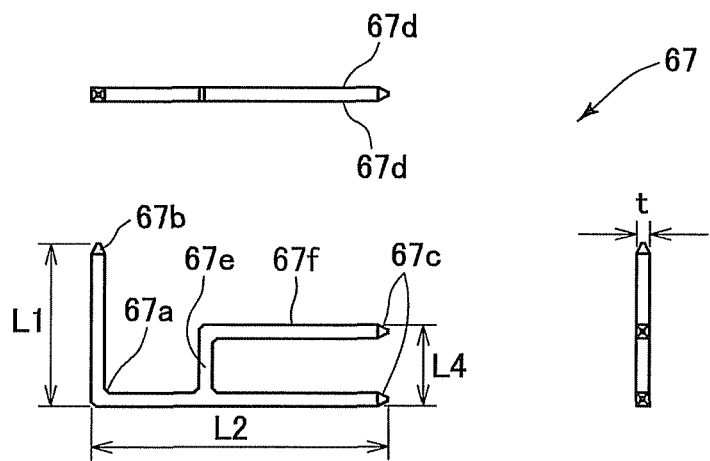
FIG. 8(c) is a three-angled view which shows a terminal pin of the electrical connector of FIGS. 7(a) and 7(b)

The first terminal pin 66 is, as can be seen from FIG. 8(b), bent into a crank-shape. The sections of the first terminal pin 66, as suffixed with the same characters as in FIG. 8(a), are identical in structural function with those of the first terminal pin 65. The first terminal pin 66 is made by punching a metal plate which is already folded into an L-shape and has a thickness t to form an L-shaped strip similar in shape to the first terminal pin 65 and then bending the L-shaped strip, as can be seen in FIG. 8(b), twice horizontally at portions 66e at right angles into a crank-shape, thereby completing the first terminal pin 66. Specifically, the first terminal pin 66 has the L-shape made up of the upright and horizontal sections 66b and 66c. The horizontal section 66c is folded into the crank-shape on a plane extending perpendicular to the length of the upright section 66b to form three sections 601, 602, and 603. The length L3 of the upright section 66b (i.e., the height of the second terminal pin 66) that is the distance between the tip of the upright section 66b and the bend 66a is smaller than the length L1 of the upright section 65b of the first terminal pin 65. The length L2 of the horizontal section 66c (i.e., the distance between the bend 66a and the tip of the horizontal section 66c) is identical with the length L2 of the horizontal section 65c of the first terminal pin 65. The section 601 extends substantially parallel to the section 602. The section 603 extends perpendicular to the sections 601 and 602. The section 602 is located away from the section 601 in a direction parallel to the section 603 by the length of the section 603, so that the section 602 extends, as illustrated in FIG. 8(a), over and parallel to the horizontal section 65c of the first terminal pin 65 within the shell of the connector 44.

The second terminal pins 67 are, as described above, identical in structure with each other. The sections of the second terminal pin 67, as suffixed with the same characters as in FIGS. 8(a) and 8(b), are identical in structural function with those of the first terminal pins 65 and 66. Specifically, the second terminal pin 67 is bent at right angles at a portion 67a to form the upright section 67b and the branched horizontal sections 67c. A lower one of the two horizontal sections 67c, as viewed in FIG. 8(c), will also be referred to as a lower section below, while an upper one of the horizontal sections 67c will also be referred to as an upper section below. The lower section 67c is identical in shape with the horizontal section 65c of the first terminal pin 65. The upper section 67c diverges from a middle portion of the length of the lower section 67c and servers as a branch conductive terminal. The upper section 67c is made up of an upright section 67e and a horizontal section 67f extending substantially perpendicular to the upright section 67e. The upright section 67e extends substantially parallel to the upright section 67b. The horizontal section 67f extends substantially parallel to the lower section 67c. The upper and lower sections 67c, as can be seen in FIG. 7(a), serve as branch conductive pins and lay on a plane extending through the upright section 67b. The second terminal pin 67 is, as is clear from the above, designed as a two-pin terminal.

The length L1 of the upright section 67b is identical with that of the upright section 65b of the first terminal pin 65. The length L4 of the upright section 67e that is the interval between the upper and lower sections 67c is equal to the length L1 minus the length L3 of the upright section 66b of the first terminal pin 66 (i.e., L4=L1−L3).

The length L2 of the lower section 67c of the second terminal pin 67 is identical with those of the horizontal sections 65c and 66c of the first terminal pins 65 and 66.

As described above, the upright sections 65a, 66b, and 67b of the first and second terminal pins 65, 66, and 67, as illustrated in FIG. 7(a), pass vertically through the shell of the connector 44 (i.e., the bottom wall of the casing 45) and are arrayed to be flush with each other on a plane extending substantially perpendicular to the length of the connector 44 (i.e., parallel to the axis of the sensor holder 43). The horizontal sections 65c and 67c of the first and second terminal pins 65 and 67 extend horizontally to be flush with each other on a plane extending substantially parallel to the length of the connector 44. Similarly, the upper sections 67f of the second terminal pins 67 and the horizontal section 66c of the first terminal pin 66 extend horizontally to be flush with each other on a plane extending substantially parallel to the length of the connector 44.

The connector 44 is made by resin, for example, using the injection molding techniques. The terminal pins 65, 66, and 67 are insert-molded with the connector 44.

The ultrasonic sensor 3 of this embodiment and the prior art ultrasonic sensor 3' will be compared below with reference to FIGS. 9(a) and 9(b). The components of the prior art ultrasonic sensor 3' corresponding to those of the ultrasonic sensor 3 are denoted by the same reference numbers suffixed with "'". The bezel 49' of the prior art ultrasonic sensor 3', as illustrated in FIG. 9(b), is equipped with a metal spring 53'. The metal spring 53' has one end secured to the ultrasonic sensor 3' and the other end which is to be stretched when the ultrasonic sensor 3' is inserted into the mount hole 47 of the bumper 2 or 4. The stretching of the other end of the metal spring 53' may result in plastic deformation of the metal spring 53'.

The ultrasonic sensor 3 of this embodiment includes the retainer 54 made of resin that is an elastically deformable material. The retainer 54, as described above, has the arms 52 with the claws 53. When the ultrasonic sensor 3 is inserted into the mount hole of the bumper 2 or 4, the arms 52 are deformed along with the claws 53 toward the longitudinal center line of the retainer 54 (i.e., the center of the annular base 52). Each of the claws 53 is shaped like a resinous thin plate and is, therefore, hardly subjected to the plastic deformation and requires a little pressure to mount the ultrasonic sensor 3 in the bumper 2 or 4.

The connector 44' of the prior art ultrasonic sensor 3' is an in-line six-pin plug with six terminal pins 65' arrayed horizontally in line, thus resulting in an increase in width W'. Each of the terminal pins 65' has upper and lower surfaces as electric contacts with a socket of a mating connector and is, thus, equipped with upper and lower lances 68' for achieving a firm joint with the mating connector. This results in an increase in height H' of the connector 44 including the lances.

Figure 9A:
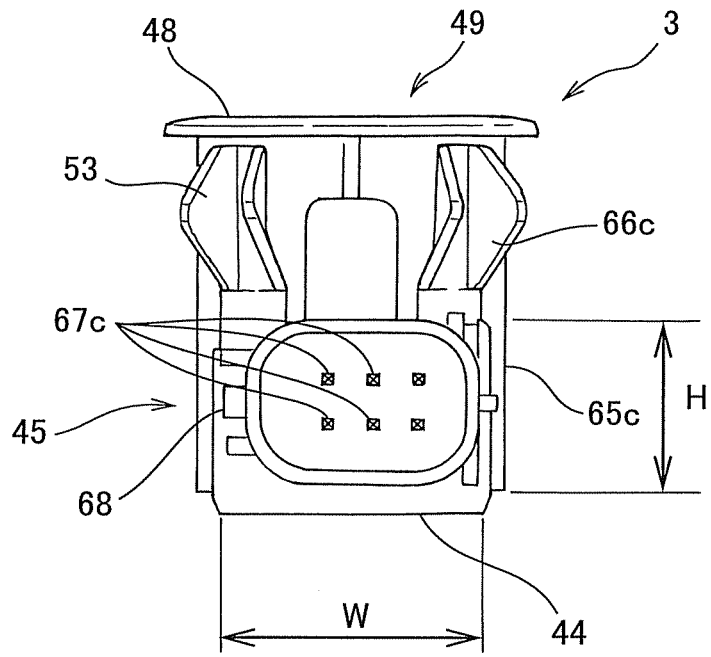
FIG. 9(a) is a front view of an electrical connector of the ultrasonic sensor of FIG. 4.
Figure 9B:
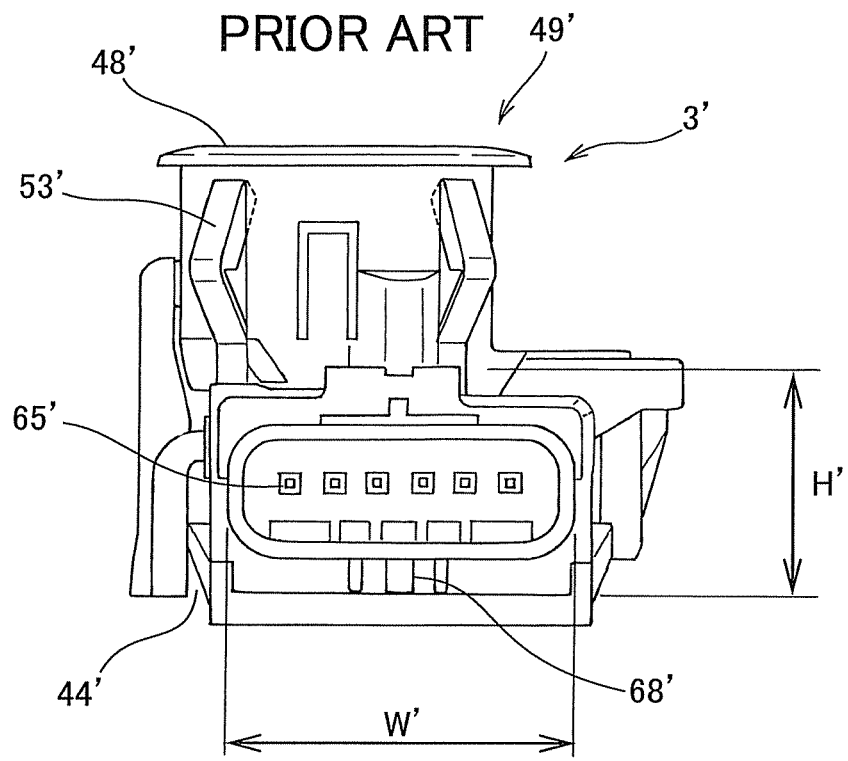
FIG. 9(b) is a front view of a conventional electrical connector.

The ultrasonic sensor 3 of this embodiment is, as can be seen from FIG. 9(a), designed as a two-line six-pin plug equipped with two arrays each of which has three contact pins. Specifically, the ultrasonic sensor 3 includes the four terminal pins 65, 66, and 67 which are arrayed and shaped to have six contact pins arranged in a grid pattern. In other words, the ends of the six contact pins (i.e., sections 65c, 66c, and 67c) lie on intersections of vertical and horizontal lines of the grid pattern, as viewed from the opening 48 of the connector 44 in the lengthwise direction (i.e., the axial direction) of the connector 44. Each of the terminal pins 65, 66, and 67 has the side surfaces that are to establish electrical contacts with the socket of one of the harnesses 29a to 29f, thus permitting, as illustrated in FIG. 9(a), the side walls of the connector 44 to have lances 68 without the need for increasing the width W of the connector 44. The lances 68 are formed on the side walls of the connector 44, thus not increasing the height H of the connector 44. This facilitates the ease of inserting the connector 44 into the mount hole 47 of the bumper 2 or 4.

The installation of the ultrasonic sensor 3 in the mount hole 47 of, for example, the bumper 2 will be described below with reference to FIGS. 10(a) to 11(b).

The ultrasonic sensor 3 into which the sensor device 41, the bezel 49, the retainer 54, the casing 45, etc., are assembled is, as illustrated in FIG. 10(a), inserted at the connector 44 into the mount hole 47. The connector 44 of the ultrasonic sensor 3 is, as described above, designed as a six-pin plug using the four terminal pins 65 to 67 and, thus, as illustrated in FIGS. 9(a) and 9(b), has the width W and the height H smaller than the width W' and the height H' of the conventional ultrasonic sensor 3', respectively, thus facilitating the ease of insertion of the connector 44 into the mount hole 47.

Figure 11A:
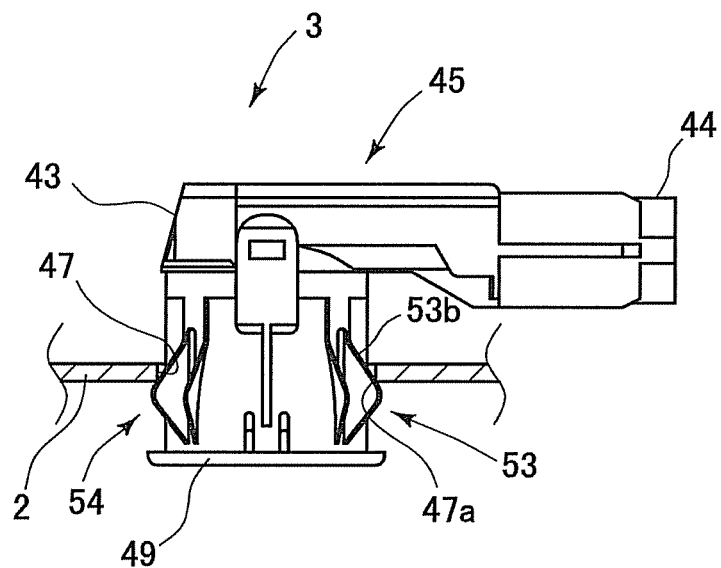
FIGS. 11(a) and 11(b) are views which demonstrate steps of installing the ultrasonic sensor of FIG. 4 to a bumper of an automotive vehicle.

When the connector 44 of the casing 45, as illustrated in FIG. 10(b), has passed through the mount hole 47 of the bumper 2, the ultrasonic sensor 3 is tilted and rotated to insert the sensor holder 43 through the mount hole 47 until the annular base 51 of the retainer 54 passes through the mount hole 47, and the slant surfaces 53b of the claws 53 of the retainer 54, as illustrated in FIG. 11(a), hit an outside inner edge 47a of the mount hole 47. Subsequently, the ultrasonic sensor 3 is pushed to thrust the claws 53 into the mount hole 47, thus causing the arms 52 to be elastically deformed inwardly of the annular base 51 (i.e., toward the axis of the retainer 54, as indicated by the arrows 62 in FIG. 6(c)) to permit the claws 53a to pass through the mount hole 47. The slits 61 formed in the arms 52 and the thin-walled portions 63 of the annular base 51 facilitate the elastic deformation of the arms 52 and the passage of the claws 53a through the mount hole 47. The elastic deformation of the arms 52 results in a decreased diameter of the circle C, as illustrated in FIG. 6(a), passing through outermost tops of the claws 53, so that it becomes smaller than the inner diameter of the mount hole 47, thereby permitting the retainer 54 to pass through the mount hole 47. The surfaces 53b of the ridges of the claws 53 are, as described above, inclined relative to the longitudinal center line of the retainer 54 (i.e., the direction in which the bezel 49 and the retainer 54 are inserted into the mount hole 47), thus facilitating the insertion of the ultrasonic sensor 3 through the mount hole 47.

Figure 11B:
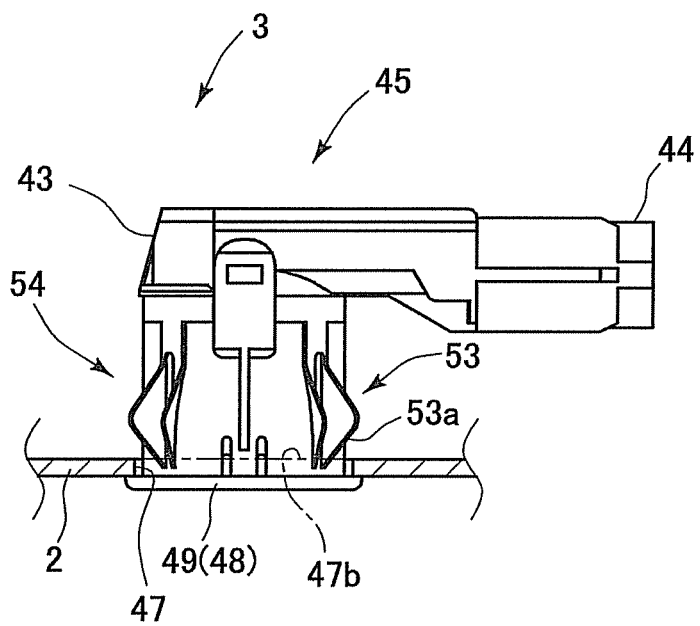
Figure 12A:
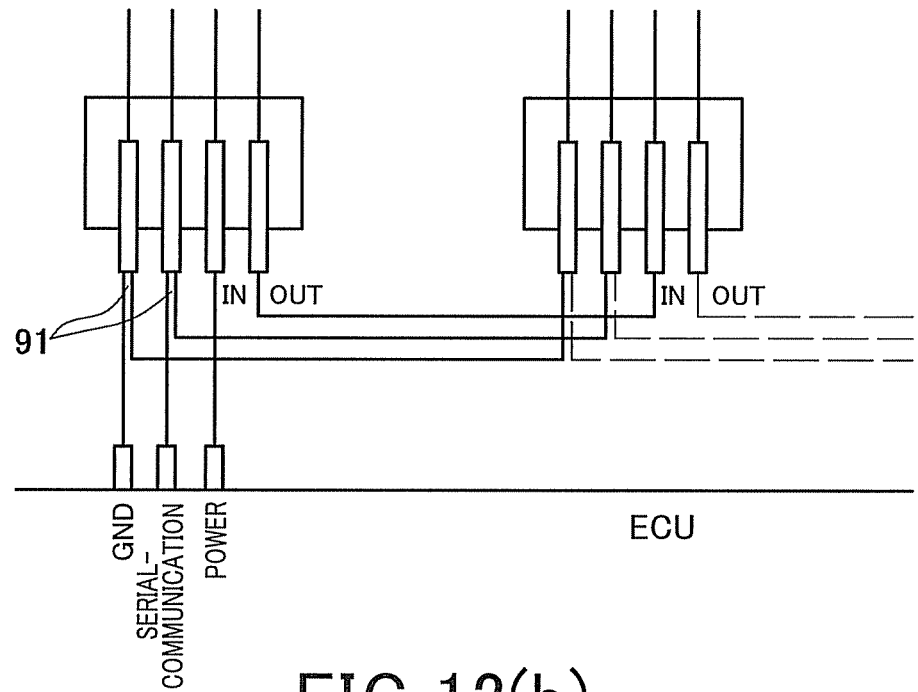
FIGS. 12(a) and 12(b) are plan views which show examples of daisy-chain connections of conventional electrical connectors.
Figure 12B:
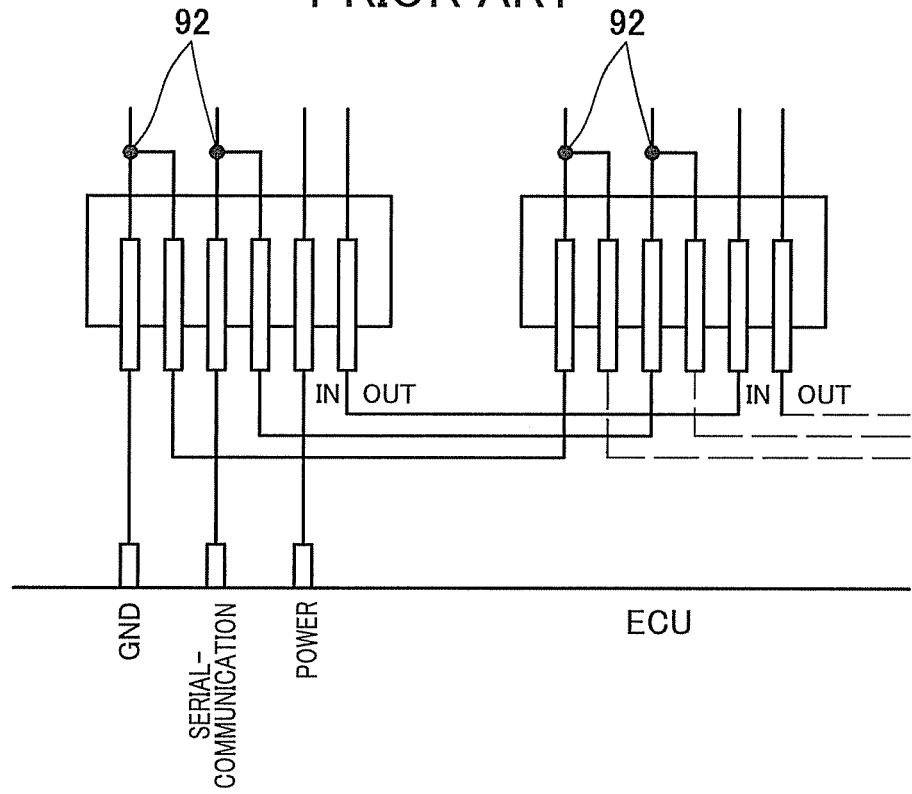
Figure 13:
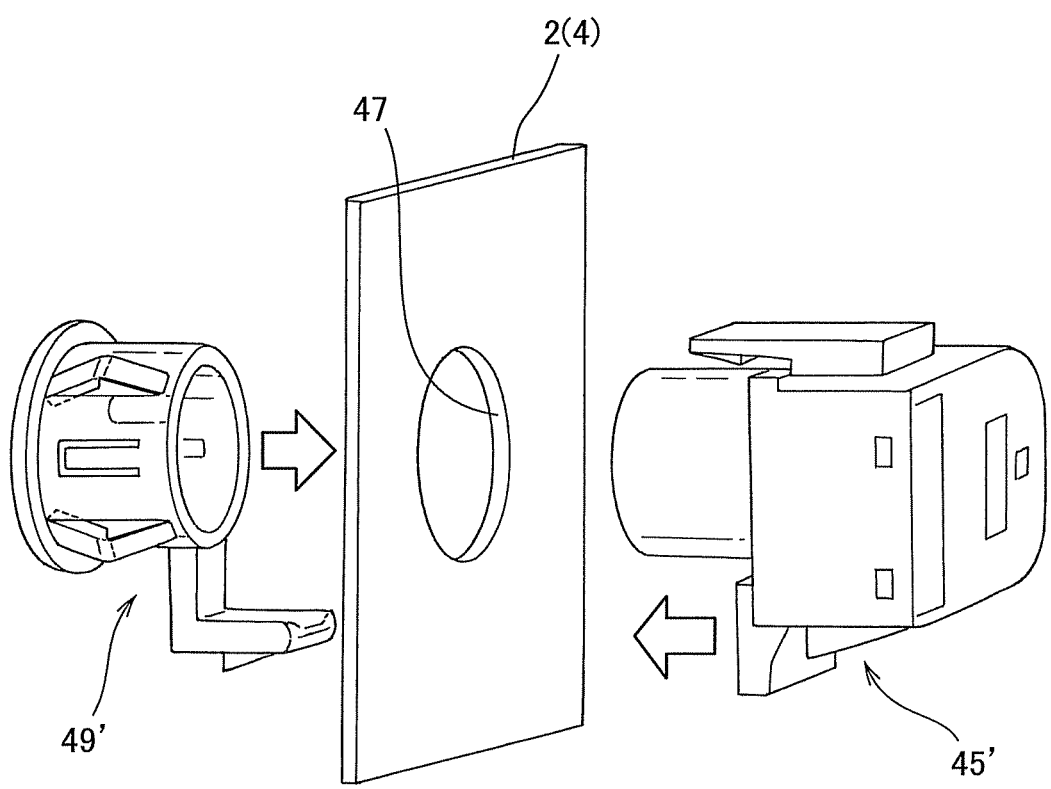
FIG. 13 is a perspective view which shows installation of a conventional ultrasonic sensor to a bumper of an automotive vehicle.

When the outermost tops of the claws 53 have passed through an inside inner edge 47b of the mount hole 47, as illustrated in FIG. 11(b), the slant surfaces 53a of the ridges of the claws 53 slide inwardly of the mount hole 47 along the inside inner edge 47b, so that the claws 53 (i.e., the arms 52) expand elastically outward in directions opposite the directions C in FIG. 6(c). When the flange 48 of the bezel 49 hit against the outside surface of the bumper 2 around the mount hole 47, the claws 53 are returned to original positions thereof, and the slant surfaces 53a of the claws 53, as indicated by a broken line in FIG. 11(b), are placed in abutting contact with the inside inner edge 47b of the mount hole 47, thereby nipping the wall of the bumper 2 tightly between the slant surfaces 53a of the claws 53 of the retainer 54 and the flange 48 of the bezel 49. The ridges of the claws 53 of the retainer 54 which are closer to the flange 49 (i.e., the surfaces 53a of the claws 53) are inclined inwardly from outside to inside the mount hole 47 of the bumper 2. Consequently, the elasticity of the claws 53 and the arms 52 serve to hold the wall of the bumper 2 between the surfaces 53a of the claws 53 and the inside surface of the flange 47 tightly. This absorbs an error of thickness of the bumper 2 and achieves the tight fit of the ultrasonic sensor 3 in the mount hole 47. The removable of the ultrasonic sensor 3 from the mount hole 47 of the bumper 2 is achieved by pulling the bezel 49 outward in the axial direction of the retainer 54 to elastically contract the claws 53 inward of the retainer 54.

As apparent from the above discussion, the installation or removal of the ultrasonic sensor 3 into or from the mount hole 47 is accomplished easier than the conventional ultrasonic sensor 3'. The connection of one of the harnesses 29a to 29f to the ultrasonic sensor 3 may be achieved by passing the connector (not shown) of the one of the harnesses 29a to 29f from inside to outside the mount hole 47 of the bumper 2, joining the connector 44 of the ultrasonic sensor 3 to the connector of the one of the harnesses 29a to 29f outside the bumper 2, and fitting the ultrasonic sensor 3 into the mount hole 47 in the manner, as described above.

The casing 45, the sensor holder 43, and the connector 44 of the ultrasonic sensor 3 may alternatively be formed as discrete members.

The bezel 48 and the connector 44 of the casing 45 are so oriented as to have lengths thereof extending perpendicular to each other, but may alternatively be made to have the lengths traversing each other at a given angle other than 90°.

The above described structure may also be used with range sensors using optical or electromagnetic devices other than ultrasonic devices.

The ultrasonic sensor 3 may be installed in vehicles other than wheeled vehicles.

The first terminal pins 65 and 66 of each of the ultrasonic sensors 3 are, as described above, used as a power supply input terminal and a power supply output terminal, but however, alternatively be designed as signal input and output terminals into and from which signals are inputted from and outputted to the ECU 9.

The ultrasonic sensor 3 may also be designed to have at least one of the first terminal pins 65 and 66 and at least one of the second terminal pins 67. Either one of the second terminal pins 67 may have at least two branched pins (i.e., the second sections 67c.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment witch can be embodied without departing from the principle of the invention as set forth in the appended claims.

What is claimed is:

1. A distance sensor which is to be mounted in a vehicle comprising:
  a sensor device which works to transmit a signal and receive a return of the signal from an object to determine a distance to the object;
  a casing in which the sensor device is retained; and
  an electrical connector joined to the casing, the connector having an opening formed therein and also having a plurality of terminal strips disposed therein; wherein
  a first terminal strip includes a first section leading to the sensor device and a second section extending toward the opening for achieving an electric connection with a mating member;
  a second terminal strip includes a first section leading to the sensor device and a second section extending toward the opening for achieving an electric connection with the mating member;
  a third terminal strip includes a first section leading to the sensor device and at least two branched second sections extending toward the opening for achieving electric connection;
  a fourth terminal strip includes a first section leading to the sensor device and at least two branched second sections extending toward the opening for achieving electric connections with the mating member, wherein
  the first sections of the first terminal strip, the second terminal strip, the third terminal strip, and the fourth terminal strip are arranged in a 4×1 array, and the second sections of the first terminal strip, the second terminal strip, the third terminal strip, and the fourth terminal strip are arranged in a 3×2 array.

2. The distance sensor as set forth in claim 1, wherein the second sections of the first and second terminal strips serve as an input terminal to which electric power is inputted from the mating member and an output terminal from which the electric power is outputted to the mating member, respectively.

3. The distance sensor as set forth in claim 1, wherein the first and second sections of the third terminal strip are disposed on the same plane.

4. The distance sensor as set forth in claim 1, wherein one of the branched second sections of the third and fourth terminal strips diverges from another of the branched second sections of the third and fourth terminal strips through a band, wherein a length of the first sections of the first and second terminal strips is substantially identical with a length of the first section of the third and fourth terminal strips, and wherein the first sections of the first, second, third and fourth terminal strips are arrayed on a first plane, and the second section of the first terminal strip and the another of the branched second sections of the third and fourth terminal strips are arrayed on a second plane, the first plane extending perpendicular to the second plane.

5. The distance sensor as set forth in claim 1, wherein the second sections of the first terminal strip, the second terminal strip, the third terminal strip, and the fourth terminal strip are arranged in the 3×2 array as viewed from outside the opening of the connector, such that ends of the second sections of the first terminal strip, the second terminal strip, the third terminal strip, and the fourth terminal strip lie on intersections of horizontal and vertical lines of a grid pattern.

6. The distance sensor as set forth in claim 1, wherein the first, second, third and fourth terminal strips are each formed by punching a metal plate.

7. The distance sensor as set forth in claim 1, wherein the first sections of the first, second, third and fourth terminal strips are insert-molded with the connector.

8. The distance sensor as set forth in claim 1, wherein the sensor device transmits a signal in the form of an ultrasonic wave.

9. The distance sensor as set forth in claim 1, wherein the first terminal strip has the second section bent into a crank shape to have a straight section extending over the second section of the second terminal strip in parallel thereto, and wherein the straight section of the first terminal strip and one of the branched second sections of the third and fourth terminal strips are laid on a first plane, and the second section of the second terminal strip and the other of the branched second sections of the third and fourth terminal strips are laid on a second plane extending substantially parallel to the first plane.

10. The distance sensor as set forth in claim 1, wherein
   the second terminal strip is disposed between the first and third terminal strips; and
   the third terminal strip is disposed between the second and fourth terminal strips.

11. The distance sensor as set forth in claim 10, wherein the second and third terminal strips are disposed between the first and fourth terminal strips.

* * * * *